United States Patent [19]

Bisonaya et al.

[11] 4,387,738
[45] Jun. 14, 1983

[54] SPREAD CENTER FAUCET

[75] Inventors: Rudy Y. Bisonaya, Oaklawn; Gerald J. Farrell, Elmhurst, both of Ill.

[73] Assignee: Elkay Manufacturing Company, Oak Brook, Ill.

[21] Appl. No.: 249,227

[22] Filed: Mar. 30, 1981

[51] Int. Cl.³ .............................................. E03C 1/02
[52] U.S. Cl. ...................................... 137/801; 4/194; 137/359
[58] Field of Search .................... 137/359, 801; 4/192, 4/194, 195

[56] References Cited

U.S. PATENT DOCUMENTS

| | | | |
|---|---|---|---|
| 2,053,210 | 9/1936 | Southgate | 137/359 |
| 2,781,786 | 2/1957 | Young | 137/801 UX |
| 3,590,876 | 7/1971 | Young | 137/801 |
| 4,026,328 | 5/1977 | Nelson . | |
| 4,084,607 | 4/1978 | Fagert et al. | 137/359 X |
| 4,313,469 | 2/1982 | Johnson | 137/801 |

*Primary Examiner*—Gerald A. Michalsky
*Attorney, Agent, or Firm*—Leydig, Voit, Osann, Mayer and Holt, Ltd.

[57] ABSTRACT

A spread center faucet for mounting on a sink between spaced hot and cold water valves, the faucet having a continuous, curved spout tube having an inlet fitting at the end of a lower portion and a discharge head at its upper end, a hollow housing having a base member with a flat base section for mounting on the sink and an arched section leading to a discharge tip, and a cover removably secured to said base member by fasteners and defining with said base member an enclosed, elongated curved housing cavity extending from said flat base section to said discharge tip, and locking means within said housing cavity for securing and for orienting said spout tube in said cavity with said discharge head located at said discharge tip and said lower portion projecting from said flat base section of said base member for connection of said inlet fitting beneath said sink to said supply conduits, said locking means including means for clamping said spout tube to said base member.

2 Claims, 7 Drawing Figures

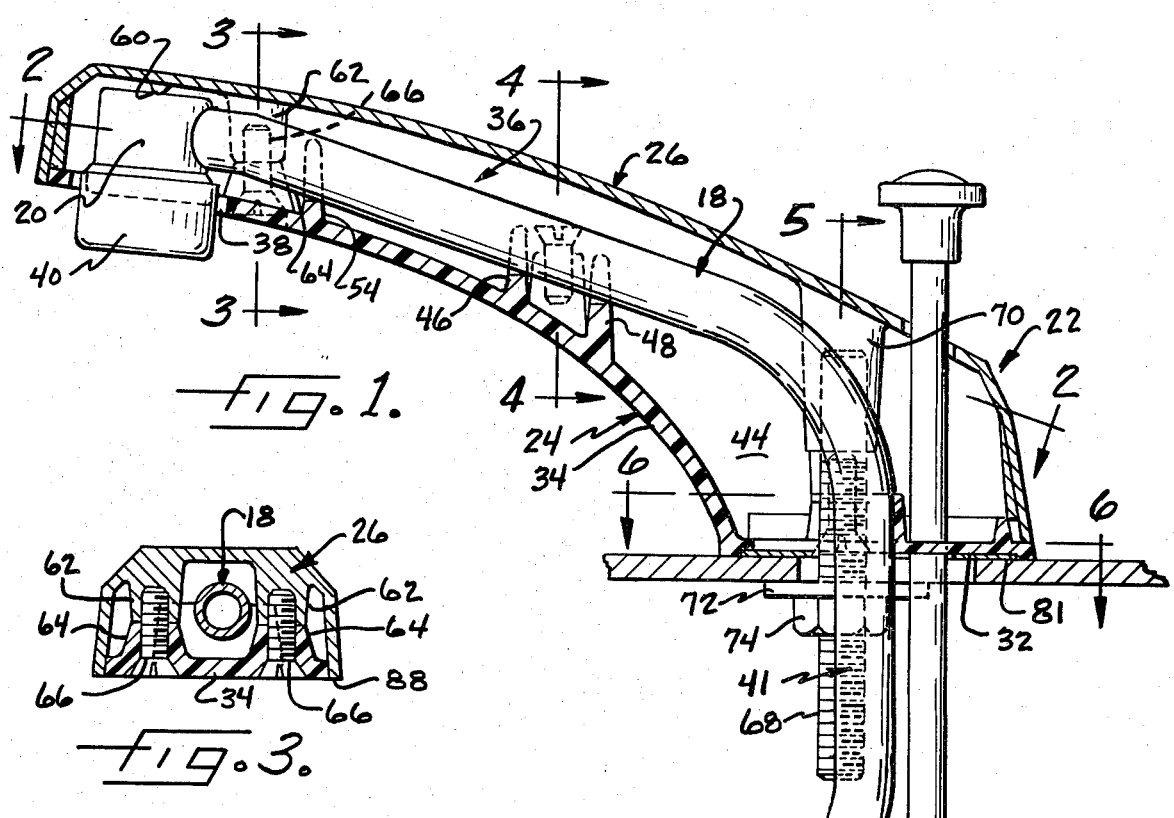
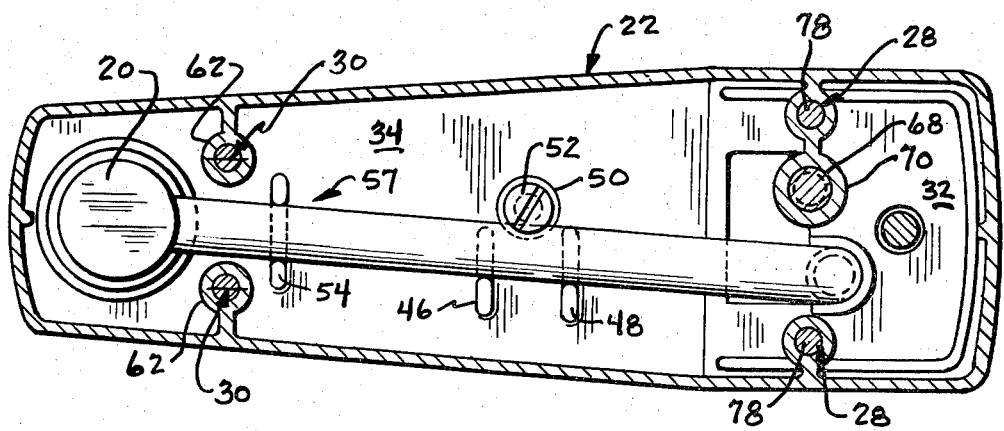

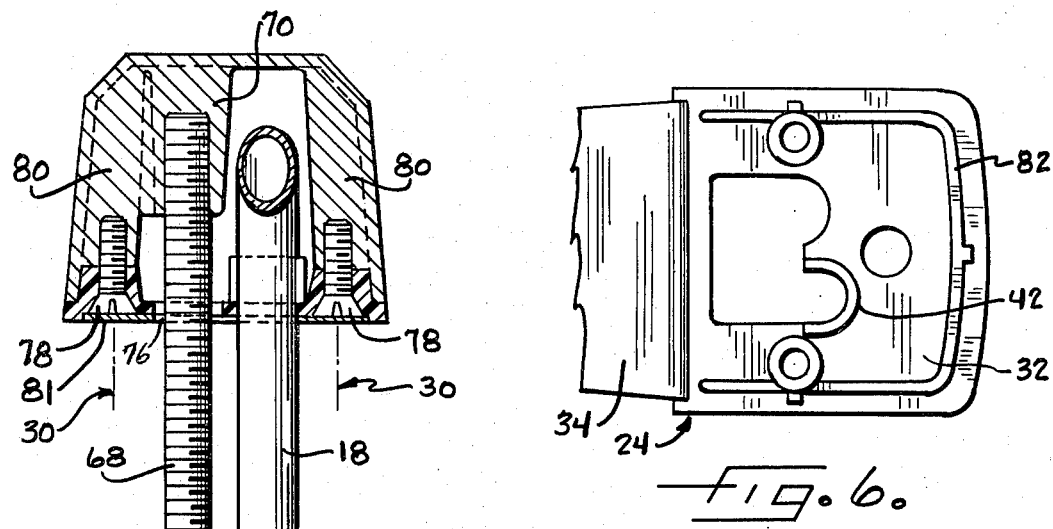
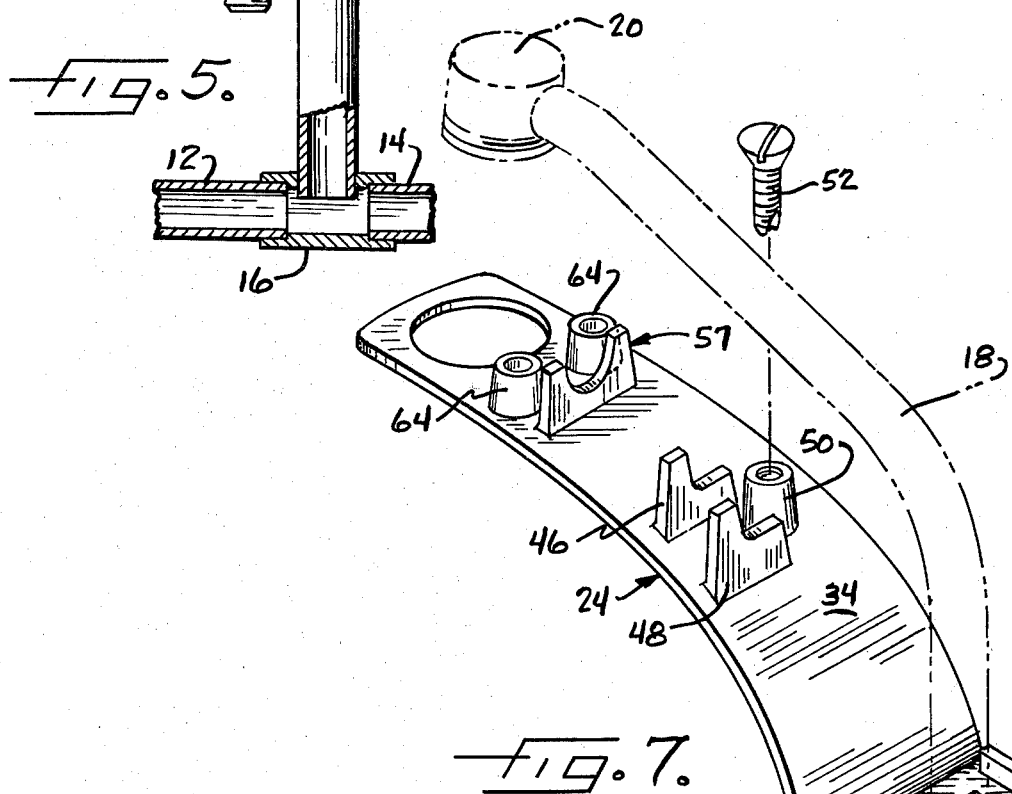

SPREAD CENTER FAUCET

This invention relates to faucets, and more particularly to an improved construction for spread center faucets comprising a hollow housing formed by a base member and a spout cover, and containing a unitary, one-piece waterway.

Heretofore, housings of spread center faucets have required major structural components for mounting the faucets such as screw-machined fittings which are expensive to manufacture, raising the cost of such faucets. The principle object of this invention is to provide spread center faucets having housings that are made entirely of molded or die cast components, and thus can be made at lower cost and yet have the strength and beauty of previous faucets that required more expensive components.

Another object is to provide a spread center faucet having a waterway of corrosion-resistant metal and locking means utilizing the springiness and strength of the components to secure and orient the waterway in the housing.

Further objects will be made apparent from the following description taken in connection with the accompanying drawings, wherein:

FIG. 1 is a vertical cross sectional view of a faucet construction embodying this invention;

FIG. 2 is a sectional view taken substantially along the irregular line 2—2 of FIG. 1 illustrating the faucet construction of that figure;

FIGS. 3-5 are transverse sectional views taken substantially in the plane of lines 3—3, 4—4 and 5—5 in FIG. 1;

FIG. 6 is a horizontal sectional view of the base section taken substantially in the plane of lines 6—6 of FIG. 1;

FIG. 7 is a perspective view of the base member looking down upon it.

A spread center faucet constructed in accordance with this invention is shown in FIGS. 1-7. This faucet is intended for mounting on a sink between spaced hot and cold water control valves each having individual operating handles, and each having a conduit 12, 14 for supplying water to an inlet T-fitting 16 of the faucet 10.

Referring to FIG. 1, in carrying out the invention, the faucet includes a continuous, single curved length of stiff but bendable and corrosion resistant tubing 18, preferably copper, that extends from the inlet T-fitting 16 to a discharge spout or head 20, the inlet fitting 16 and discharge head 20 being preferably brazed to the curved spout tube 18 to form a unitary, one-piece waterway.

Further, in carrying out the invention, the spout tube 18 extends through and is oriented and held securely in a hollow housing 22 formed by a base member 24 and a cover 26 which are secured together by removable fasteners at locations 28, 30 (FIG. 2). The base member 24 and the cover 26 of the housing 22 are made by molding or die-casting plastic or metal, and the cover 26 is preferably chrome plated for beauty. The base member 24 has a flat section 32 (FIGS. 4, 7) adapted to rest on the sink surface adjacent the bowl in the customer centered location, and an arched section 34 that extends forward over the bowl. The cover 26 is U-shaped in cross-section to form a hollow structure with the base member 24, and the spout tube 18 is clamped rigidly in the cavity between the base member and spout cover so that a terminal portion 36 including the discharge head 20 cannot move, the discharge head 20 of the spout tube 18 being aligned with a round opening 38 adjacent the tip of the arched section 34 of the base member 24 which opening 38 is large enough to allow an aerator device 40 to extend through the opening 38 and to be threaded onto the discharge head 20 so as to aerate water discharged from the head into the sink bowl. Referring to FIGS. 1 and 4, the lower end 41 of the spout tube 18 projects through and fits snugly in a semi-cylindrical sleeve carried by the flat section 32 of the base member 24 which prevents lateral movement of the lower end of the spout tube and thereby maintains the discharge axis of the aerator 40 vertical and properly aims the water stream. The spout tube end is located for connection of the inlet T-fitting 16 beneath the sink to the supply conduits 12, 14 leading to the hot and cold water valves.

The spout tube 18 is bent to a curved, generally L-shape in order to fit within the elongated, curved cavity 44 in the hollow housing 22. In assembly of the faucet, the L-shaped spout tube 18 is clamped to the base member 24 which includes a first means for securing the terminal portion 36 of the spout tube 18 rigidly against longitudinal movement in the housing cavity 44. Further, second means are provided including the cover 26 and base member 24 which cooperate for aligning the discharge head 20 with the opening 38 in the base member 24.

Referring to FIGS. 1-3, the terminal portion 36 of the spout tube 18 is held by said first means, herein shown as a locking means which includes a seat on the base member 24 provided by a pair of longitudinally spaced upstanding ears 46, 48 carried at about the midpoint of the arched section 34 of the base member 24. These ears 46, 48 each form a curved seat, as can be seen in FIGS. 2 and 4, for the spout tube 18. A boss 50 between and laterally spaced from the pair of ears 46, 48 provides a screw socket adjacent the seat for the spout tube 18. A capscrew 52 is received in the screw socket such that the head of the screw 52 bites into the outside of the spout tube 18 when the capscrew is tightened to rigidly clamp the spout tube in the seat against longitudinal movement. Clamping the terminal portion 36 of the spout tube 18 in the seat in this manner also holds it against lateral movement at that point of support.

As above noted, the base member 24 of the housing 22 has an opening 38 at the discharge tip for the discharge head 20 of the spout tube 18. Means for aligning the discharge head 20 with the opening 38 includes a boss 54 carried by said base member 24 adjacent the discharge opening 38 and defining a saddle 57 for the spout tube 18. As a preferred means for clamping the spout tube 18 in the saddle 57, in the present embodiment of the invention the cover 26 is secured to the base member 24 by a pair of removable screw fasteners 58 at the location 28 and as the screw fasteners 58 are tightened the cover 26 is caused to engage the discharge head 20 and force the head downward to FIG. 1 together with the intermediate section of the spout tube 18 connected to the head 20 which is forced into the saddle 57. A pair of round bosses 60 on the inside of the cover 26 contact the head 20 as indicated in FIG. 1. By these means, the discharge head 20 and the terminal portion 36 of the spout tube 18 are held rigidly for proper orientation of the discharge head 20 centered in the opening 38 with its discharge axis vertical and for preventing movement including vibrational movement due to the passage of water through the waterway.

It is desired to utilize the springiness of the base member 24 to maintain constant pressure on the discharge head 20 and bar movement in the housing 22. For this purpose the spout tube 18 is bent only slightly adjacent the discharge head 20, so that upon assembly of the cover 26 to the base member 24 two bosses 62 formed integral with the cover at the location 28 have an initial gap with two aligned bosses 64 formed integral with the base member 24. The two bosses 62 on the cover 26 accept the threaded portions of two fastener screws 66, which when tightened bring the aligned bosses 62, 64 into contact by slightly bending the bottom wall of the base member 24 carried thereby.

For mounting the faucet on a sink, a hold-down stud 68 is carried by the cover 26, received in a downwardly extending threaded boss 70 integral with the cover. A washer 72 which presents a bearing surface to the underside of a countertop or other unit on which the sink is mounted, and a locking nut 74 completes the hold-down means by which the housing 22 may be secured to a sink. The hold-down stud 68, as seen in FIG. 5, extends through a slot 76 in the flat section 32 of the base member 24 to project beneath the sink for receiving the washer 72 and nut 74 of the hold-down assembly. One of the features of this hold-down means is the elimination of structural components normally employed for mounting faucet constructions of this type. The mounting stud 68 is completely independent of the spout tube 30 waterway 18 which, in this case, is clamped securely to the base member 24 of the faucet, and as the cover 26 is pulled down as the nut 74 is tightened on the stud 68 during installation of the faucet, the pull-down does not distort the waterway.

While the housing 22 may be made from various materials, die cast or molded metal or plastic is preferred for the base member 24 and cover 26 components, chrome plated for appearance. ABS plastic material is preferred for the plastic components for its high impact strength and toughness. This material provides the strength and springiness desired for locking the spout tube 18 in position in the hollow housing 22 by clamping and coaction of the cover 26 and base member 24. The cover 26 and base member 24 are held together to form the hollow housing 22 by two sets of drive screws 66, 78, one set 66 adjacent the discharge head 20 and the other set 78 at the location 30 and received in bosses 80 on the cover 26 and extending through the flat base section 32 of the base member as shown in FIG. 5. After assembly of the housing, a fiber gasket 81 is placed in a recess in the bottom of the flat base section 32 which rests on the sink. As can be seen in FIG. 7, the top of the flat base section 32 of the base member 24 is provided with a raised strengthening wall 82 that has vertical ribs 84 which are abutted by the inside of the cover 26 and locate the cover so that its outer surface is flush with the edge 86 of the flat base section 32 when the base member 24 and cover 26 are assembled and held together by the drive screws 66, 78. The arched section 34 of the base member 24 is located inside the cover 26 in their assembled condition with the lower edge 88 of the cover 26 flush with the exposed lower surface of the arched section 34 (FIGS. 3, 4) to provide a box structure for strength and good appearance.

We claim:

1. A spread center faucet for mounting on a sink between spaced hot and cold water valves, each having a supply conduit for connection to the faucet, said faucet comprising:
    a continuous, curved spout tube having an inlet fitting at the end of a lower portion and a discharge head at the upper end of a terminal portion,
    a hollow housing having a base member with a flat base section for mounting on the sink and an arched section leading to a discharge tip having an opening, and a cover removably secured to said base member by fasteners and defining with said base member an enclosed, elongated curved housing cavity extending from said flat base section to said discharge tip,
    locking means within said housing cavity for securing and for orienting said spout tube in said cavity with said discharge head located at said discharge tip and said lower portion projecting from said flat base section of said base member for connection of said inlet fitting beneath said sink to said supply conduits.
    said locking means including means carried by said base member providing a longitudinally extending seat at an intermediate point of said spout tube,
    a screw socket on said base member adjacent said seat,
    a screw received in said socket for rigidly clamping said spout tube in said seat against longitudinal movement,
    second means carried by said base member adjacent said opening in said discharge tip and defining a saddle for said spout tube aligning said discharge head with said discharge opening;
    means including said cover for clamping said spout tube in said saddle,
    means defining an opening in said flat base section receiving and limiting movement of said lower portion of said spout tube, and
    hold-down means carried by said cover and projecting through said flat base section for securing said faucet on said sink.

2. A spread center faucet for mounting on a sink between spaced hot and cold water valves, each having a supply conduit for connection to the faucet, said faucet comprising:
    a continuous, curved spout tube having an inlet fitting at the end of a lower portion and a discharge head at the upper end of a terminal portion,
    a hollow housing having a base member with a flat base section and an arched section leading therefrom to a discharge tip, and a spout cover removably secured to said base member by fasteners and defining with said base member an enclosed, elongated curved housing cavity extending from said flat base section to said discharge tip,
    locking means within said cavity for securing and for orienting said spout tube in said housing cavity including means carried by said base member providing a longitudinally extending seat at an intermediate point of said spout tube,
    a screw socket on said base member adjacent said seat,
    a screw received in said socket for rigidly clamping said spout tube in said seat against longitudinal movement,
    second means carried by said base member adjacent said opening in said discharge tip and defining a saddle for said spout tube aligning said discharge head with said discharge opening, means including said cover for clamping said spout tube in said saddle,
means defining an opening in said flat base section receiving and limiting movement of said lower portion of said spout tube, and
said lower portion of said spout tube projecting from said flat base section of said base member for connection of said inlet fitting beneath said sink to said supply conduits.

* * * * *